3,586,479
PRODUCTION OF SYNTHETIC FAUJASITE

Gerhard Heinze, Schildgen, and Friedrich Schwochow and Horst Weber, Leverkusen, Germany, assignors to Farbenfabriken Bayer Aktiengesellschaft, Leverkusen, Germany
No Drawing. Filed Sept. 23, 1968, Ser. No. 761,803
Int. Cl. C01b 33/28
U.S. Cl. 23—112                                       11 Claims

ABSTRACT OF THE DISCLOSURE

Process for the production of synthetic zeolites with faujasite structure wherein an alumina-containing sodium boro-silicate glass containing at least 0.8 mol of sodium oxide per mol of each $Al_2O_3$, $SiO_2$ and $B_2O_3$ is prepared and thereafter divided to small particles, whereupon the glass particles are converted to the crystalline zeolite by heating an aqueous mixture of the glass particles to about 60–100° C. over a period of time sufficient to form the desired faujasite zeolite, the water to form the aqueous mixture being used in an amount of from about 400–1400 ml. per 100 g. of glass.

---

This invention relates to an improved process for the production of zeolites of faujasite structure.

Over the last 10 years, zeolites have been extensively used in chemical engineering as selective adsorbents and as catalysts, and their significance still shows no signs of diminishing. Although abundant deposits of natural zeolites such as erionite, mordenite, chabasite and clinoptilolite, so valuable in industry, have recently been found, there is still considerable interest in synthetically producing certain types of zeolite because they do not occur naturally in sufficient quantities or in the requisite purity. This applies in particular to the fairly rare mineral faujasite which was described for the first time by Damour, Ann. d. mines (1842), page 395. It had been recognized as early as in 1932 that faujasite was foremost in the series of natural zeolites with regard to the free pore space, and is of considerable interest as an adsorbent by virtue of this property.

Generally speaking, zeolites are crystalline alkali metal or alkaline earth metal aluminosilicates containing water, with a rigid three-dimensional reticular structure. Their chemical composition is represented by the formula:

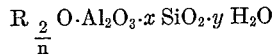

$$R_{\frac{2}{n}}O \cdot Al_2O_3 \cdot x\, SiO_2 \cdot y\, H_2O$$

in which R represents a mono- or polyvalent metal atom or H, $NH_4$, $CH_3$—$NH_3$ and so on, $x$ may have any value from 1.8 to about 10, $y$ may have any value from 0 to 8 and $n$ represents the valency of R. However, chemical composition alone is not characteristic of any given zeolite, so that X-ray diffraction spectra are additionally used to identify zeolite crystal structures. There are today a number of different zeolites which differ from one another in their crystal structure and hence in their X-ray diffraction spectra. Some of these zeolites occur naturally whilst others have been synthetically produced for many years although they have never been unequivocally identified because the methods of analysis by X-ray photography had not been adequately developed until recently. Other types have only recently been obtained for the first time in the laboratory.

It is important that the water of crystallization in zeolites can be removed by heating without any substantial changes in the crystal lattice. Dehydration is accompanied by the development inside the crystals of regularly formed cavities of exactly constant dimensions which are connected by equally regularly formed channels or pores. Some zeolites have pore diameters of approximately 3, 4 and 5 A. units and are known as narrow-pored zeolites. By contrast, the crystal structure of faujasite which has pore diameters of from about 8 to 10 A., depending upon the cations present, is known as wide-pored. Unlike the aforementioned zeolites, wide-pored zeolites also adsorb branched and cyclic hydrocarbons and are distinguished by their high rate of adsorption in the adsorption of relatively small molecules which basically would be adsorbed by narrow-pored zeolites. In addition, zeolites of the faujasite type are valuable catalysts.

Synthetic zeolites of the faujasite type are given names in the literature such as, for example, Z 14 Na, Z 14 HS, zeolite X, zeolite Y, zeolite 13 X, zeolite 10 X and so on. They differ from one another and from the mineral faujasite in their levels of purity, in the type of cations R and the relative quantities in which they are present and in the ratio of $SiO_2$ to $Al_2O_3$ varying within wide limits, a property which many zeolites have in common with other aluminosilicates. All these variables promote alight variations in the position and intensity of the characteristic X-ray interferences. However, a competent expert will recognize these products, by virtue of their X-ray diffraction spectra as belonging to the same crystal lattice type, referred to hereinafter as the faujasite type.

A precise structural analysis of faujasite was made by Bergerhoff et al., N. Jakob, Min., Monatsk. (1958), page 193.

Generally speaking, synthetic zeolites may be produced by the so-called wet and dry processes. In the wet process, amorphous zeolites are precipitated from solutions of suitable starting components and crystallized under hydrothermal conditions. In the dry process, the suitable starting materials are fused or sintered, optionally following the addition of fluxes, and are then crystallized by introduction into water (Siedler, 7. Angew. Chemie 22 (1909) page 1020).

In one known process, cf. German patent specification No. 1,038,016, zeolites of faujasite structure with an $Al_2O_3:SiO_2$ ratio of up to 1:3 are obtained by converting mixtures of sodium aluminium silicate and water, whose molar compositions expressed by the proportional numbers $SiO_2:Al_2O_3$, $Na_2O:SiO_2$ and $H_2O:Na_2O$ must lie within certain limits, into crystalline sodium aluminium silicates under hydrothermal conditions within periods of at least 15 minutes at temperatures in a range of from 20 to 120° C., preferably 100° C. According to the specification, the reactants: silica gel, silica, colloidal silica or sodium silicate on the one hand, activated aluminium oxide, $\gamma$ aluminium oxide, aluminium oxide trihydrate or sodium aluminate on the other hand, and NaOH and water, are advantageously mixed at room temperature and then treated under hydrothermal conditions. Although there is no specific instruction to the effect that the mixture should not be stirred during heating and crystallization, it has been found in practice that this process only gives satisfactory results if the mixture is not stirred and if in addition certain restrictions are applied to the selection of starting materials that may be used. Most of the starting materials listed are totally unsuitable for the process. The reproducibility of this known process is inadequate.

In order to obviate this disadvantage, it is proposed in German patent specification No. 1,038,015 to heat solutions containing sodium silicate, sodium aluminate and NaOH separately to the crystallization temperature in a range from about 80 to 100° C. to combine them quickly and thoroughly and to keep them at the aforementioned temperature of 80 to 100° C. for at least 5 hours until the crystal lattice of the molecular sieve has been formed. Unfortunately, this process does not provide very satisfactory results either. According to another proposal (German patent specification No. 1,138,383) the reaction mixture is prepared at temperatures in the range of from 6 to 70° C., and in particular in the range from 13 to 38° C., and the resulting mixture is left standing at this temperature for periods varying from a minimum of 2 hours up to about 9 days before the hydrothermal treatment and is then heated quickly to the crystallization temperature. Other proposals relate to the use of clay minerals, in particular amorphous meta-kaolin obtained by calcining kaolinite. Finally, the object of other known processes is to synthesize zeolites of faujasite structure with a ratio of $SiO_2:Al_2O_3$ above 3:1; colloidal silica sols, "solid, amorphous reactive silica products with a particle size of less than $1\mu$" being again the most important starting materials.

A comparison of the known processes clearly shows that, despite any similarity in their molar composition, sodium aluminium silicate/water mixtures obtained from different sources should by no means be regarded as equivalent. Accordingly, the raw materials used should be identified with extreme caution, particularly in cases where colloidal starting materials or finely divided solids are involved. In addition, it has been found that even those starting materials which at first sight appear well-defined, namely sodium silicate solutions and sodium aluminate solutions, are either better suited or less well suited to the synthesis of zeolites of faujasite structure, depending upon the conditions prevailing during their preparation. In other words, the reproducibility of faujasite synthesis is complicated and to some extent jeopardized by the indefiniteness of the starting materials.

The process according to the invention overcomes these disadvantages and essentially comprises treating alumina-containing sodium borosilicate glass particles with water in a quantity of from 400 to 1400 ml. per 100 g. of glass and converting the reaction mixture into crystalline zeolite of faujasite crystal structure by heating it for periods of from 12 to 48 hours to temperatures of from 60 to 100° C.

The main advantage of the process according to the invention is that no restrictions are imposed upon the selection and supervision of the starting materials. This is because specific characteristics of the starting materials used, such as particle size spectrum, specific surface, degree of polymerization, dissolution rate and so on, are without any significance in the process according to the invention because the glass used to synthesize faujasite is produced in the melt at elevated temperature where the reaction velocity is high enough for all the starting materials in question. For example, quartz sand which is sluggish in reaction may be used with equal effect instead of finely divided gel-like colloidally soluble silica or sodium silicate. It is an advantage of the process according to the invention that inexpensive starting materials may be used.

Impurities from quartz and feldspar that are present in an inexpensive kaolin are decomposed in the melt. By contrast, they remain unreacted in the end product in wet processes and so necessitate the use of high grade kaolins in cases where sodium silicate and sodium aluminate are not used as the starting materials.

Another advantage of the process according to the invention is that treatment of the melt with water is accompanied by stirring, even during the actual crystallization period. A favourable bonding of the Si and Al atoms which preferentially develop the faujasite lattice during the subsequent leaching stage obviously occurs in the melt without any signs of the stirring promoting the formation of the undesirable, valueless phillipsite and this is in contrast to the wet processes. Although it is not yet possible to give a scientifically substantiated explanation of this surprising observation, this factor is important in practice because with commercial batches the transfer of heat is facilitated by stirring.

To carry out the process according to the invention, an alumina-containing sodium borosilicate glass is melted in a first reaction stage, treated in a second reaction stage with water or dilute sodium hydroxide and then converted into the crystalline product. The following starting materials may be used to prepare the crude mixture to be introduced into the glass melting furnace: kaolin, dehydrated kaolin, feldspar, alumina hydrate, alumina, bauxite, sodium silicate, quartz, kieselguhr, finely divided silica, sodium aluminate, sodium carbonate, sodium hydroxide, sodium metaborate, borax and anhydrous borax.

The quantity in which the alkali is used in the melt batch is calculated in such a way that at least 0.8 mol and preferably from 0.85 to 1.15 mol of $Na_2O$ is used per mol of $Al_2O_3$, $SiO_2$ and $B_2O_3$ used, e.g. 3 mols of $Na_2O$ for the composition $1Al_2O_3+1SiO_2+1B_2O_3$. Lower alkali metal contents lead to glasses which react only very slowly with water whilst high alkali metal contents have too aggressive an effect upon the crucible materials and linings.

The ratio of $SiO_2$ to $Al_2O_3$ in the batch amounts to between 2 and 5 and preferably to between 2 and 3. It is an advantage of the process according to the invention that there is no need in synthesizing zeolite of faujasite structure to use an appreciable excess of $SiO_2$ which would only be subsequently lost with the mother liquors. $SiO_2:Al_2O_3$ ratios of from 2.5 to 3 are completely adequate for the crystallization of faujasite zeolite. Even with $SiO_2:Al_2O_3$ ratios of from 2 to 2.5, faujasite zeolite is mainly formed in admixture with zeolite A. By contrast, it is necessary in the conventional wet process to use higher $SiO_2:Al_2O_3$ ratios and to accept an $SiO_2$-loss in the mother liquors.

In producing the glass, boron compounds such as, for example, borax or boric acid or boron oxides may be used to reduce the temperature of the melt and to facilitate decomposition of the glass during treatment with water, from 1 to 2 mols of $B_2O_3$ being preferably used per mol of $Al_2O_3$.

The glass which has melting points of from about 800° C. to 1200° C., depending upon its alkali metal oxide and $B_2O_3$-contents, is melted by the methods normally used in the glass and enamel industries, which represents a simple, technically common process step.

It has proved advantageous to consolidate or solidify the glass melt on a water-cooled roller by the methods normally used in the production of enamel frits, resulting in the formation of flakes 0.5 to 2 mm. thick which may be processed as such without further size reduction. In cases where the melt is solidified into grains of irregular thickness, for example by allowing it to flow into water, it is advantageous to reduce the glass by grinding to a uniform particle size before it is further processed.

The glass solidified by one process or another is treated with water in a quantity of from 400 to 1400 ml. of $H_2O$ per 100 g. of glass. Hydration of the glass components is exothermic. If the water is used in quantities approaching the upper limit of the range specified, the accompanying increases in temperature are not disadvantageous to the quality of the zeolite formed, even where hot water is used. By contrast, in cases where the water is used in quantities approaching the lower limit of the range specified, the glass has to be introduced with stirring into cold water and heating has to be postponed until the evolution of heat accompanying hydration of the glass constituents has subsided. This applies in particular where ground glass is used, in which case hydration proceeds very quickly on account of the large surface. It is also possible to use dilute sodium hydroxide (approximately 2 to 4% by weight of NaOH) instead of $H_2O$. For the actual conversion into the crystalline zeolite, the reaction mixture is stirred at 60 to 100° C. until crystallization is complete. Experience has shown that 48 hours at 75° C. or 24 hours at 90° C. is sufficient.

The process according to the invention is illustrated by the following examples.

EXAMPLE 1

262 g. of kaolin, 210 g. of anhydrous borax, 705 g. of anhydrous soda and 50 g. of quartz powder were fused for 20 minutes at 1100° C. in a ceramic crucible and the resulting melt was solidified into flakes approximately 1 mm. thick by being poured onto a water-cooled roller.

Analysis of the flakes produced the following molar composition:

$$5.65Na_2O \cdot 3.16SiO_2 \cdot Al_2O_3 \cdot 1.78B_2O_3$$

100 g. of the flakes were introduced into 1320 ml. of water heated to 60° C. and the resulting reaction mixture was heated with stirring to 75° C. and then stirred for another 48 hours at 75° C. The flakes decomposed to form crystals. The crystalline reaction product was filtered off, washed out and dried. X-ray analysis showed that it consisted of pure zeolite of faujasite structure.

EXAMPLE 2

105 kg. of kaolin, 84 kg. of borax, 282 kg. of soda and 60 kg. of quartz sand were mixed together, the resulting mixture was fused at 1200° C. in a rotary furnace and the melt was solidified into flakes approximately 1.5 mm. thick by being poured onto a water-cooled roller. According to analysis, the molar composition of the flakes was as follows:

$$6.64Na_2O \cdot 4.76SiO_2 \cdot Al_2O_3 \cdot 2.02B_2O_3$$

1.5 kg. of the flakes were introduced with stirring into 6 litres of water heated to 45° C., producing a rise in temperature to 75° C. For crystallization, the mixture was stirred for 28 hours at 75° C.

After the product had been filtered off, washed and dried, chemical analysis revealed a molar composition of $0.82Na_2O \cdot 2.51SiO_2 \cdot Al_2O_3$. A Debye-Scherrer photograph showed a pure faujasite structure with a lattice constante of $a=24 \cdot 93$ A.

The $H_2O$-adsorption capacity of the resulting zeolite at an $H_2O$ partial pressure of 10 torr/25° C. amounted to 27.8% by weight.

EXAMPLE 3

No quartz sand was added in this example. 1.32 kg. of kaolin, 1.05 kg. of borax and 2.65 kg. of soda were mixed together, the resulting mixture was fused in three portions at 1100° C., in ceramic crucibles and the melt was solidified into flakes on a cooled roller. In order to obtain a uniform product for further processing, the three batches were ground together in a ball mill. The molar composition of the resulting product was as follows:

$$4.64Na_2O \cdot 2.37SiO_2 \cdot Al_2O_3 \cdot 1.81B_2O_3$$

100 g. of the ground glass were introduced into 960 ml. of water heated to 60° C., and stirred for 48 hours at 75° C. The resulting product had an $H_2O$-adsorption capacity of 26.9% by weight under the conditions specified in Example 2, X-ray analysis showed 80% of zeolite of faujasite structure in addition to zeolite A (20%).

It is surprising that the reaction of kaolin with alkali leads mainly to zeolites of faujasite structure when a borosilicate glass is produced from kaolin in the melt and then crystallized with water as described above. By contrast, the reaction of calcined kaolin with aqueous alkali according to Kumins (U.S. patent specification No. 2,544,695, Example 1) gives pure zeolite A.

Even with the other known wet processes in which sodium silicate and sodium aluminate solutions are used as the starting materials, it is only possible to obtain small quantities of zeolite of faujasite structure in addition to zeolite A as the main component for $SiO_2:Al_2O_3$ ratios of the kind that occurs in kaolin.

EXAMPLE 4

100 g. of flakes of a glass with molar composition:

$$5.26 \text{ g. } Na_2O \cdot 2.49SiO_2 \cdot Al_2O_3 \cdot 1.85B_2A_3$$

were stirred for 6 hours with 600 ml. of cold water. The temperature was then increased to 70° C. and kept for 48 hours at this level. According to X-ray analysis, the product was zeolite of faujasite structure with an impurity of 5% of zeolite A. Its $H_2O$-adsorption capacity amounted to 28.3%.

EXAMPLE 5

100 g. of flakes of a glass with the molar composition:

$$7.90Na_2O \cdot 3.85SiO_2 \cdot Al_2O_3 \cdot 2.14B_2O_3$$

were introduced into 1.2 litres of 4% sodium hydroxide and stirred for 24 hours at 70° C. According to X-ray analysis, the reaction product was zeolite of the faujasite type. It had an $H_2O$-adsorption capacity of 28.7%.

EXAMPLE 6

In this example, the alkali was used in the form of solid sodium hydroxide rather than in the form of soda. 26.4 g. of kaolin, 21 g. of borax and 39.8 g. of NaOH-powder were fused. The melt was poured onto a metal plate, and the resulting pieces were roughly size-reduced and stirred with 400 ml. of water for 24 hours at 70° C. The water-adsorption capacity amounted to 29.5%.

What is claimed is:

1. Process for the production of synthetic zeolites with faujasite structure which comprises heating alumina-containing sodium borosilicate glass particles which contain about 0.8 to 1.15 mol of $Na_2O$ per each mol of $Al_2O_3$, $SiO_2$ and $B_2O_3$, and have a $SiO_2$–$Al_2O_3$ molar ratio of from 2:1 to 5:1, and a $B_2O_3$–$Al_2O_3$ molar ratio of at least one, with water to temperatures of from about 60–100° C. over a period of at least 12 hours to form said faujasite zeolites, the water being used in a quantity of from about 400–1400 ml. per 100 g. of glass.

2. Process according to claim 1, wherein 0.85 to 1.15 mol of $Na_2O$ is used per each mol of $Al_2O_3$, $SiO_2$ and $B_2O_3$.

3. Process according to claim 1, wherein the $$SiO_2\text{–}Al_2O_3$$

molar ratio in said glass is between 2:1 and 3:1.

4. Process according to claim 1, wherein said glass contains 1 to 2 mols of $B_2O_3$ per mol of $Al_2O_3$.

5. Process according to claim 1, wherein the heating of said glass with water is accompanied with stirring.

6. Process according to claim 1, wherein the water used for the heat treatment of said glass contains about 2 to 4 weight percent of sodium hydroxide.

7. Process according to claim 1, wherein said glass is formed by melting a mixture of kaolin, borax, soda and quartz.

8. Process according to claim 1, wherein said glass is formed by melting a mixture of kaolin, borax and soda.

9. Process according to claim 1, wherein said glass is formed by melting a mixture of kaolin, borax and sodium hydroxide.

10. Process for the production of synthetic zeolites with faujasite structure which comprises forming an alumina-containing sodium borosilicate glass by melting a $Na_2O$, $Al_2O_3$, $SiO_2$ and $B_2O_3$-containing mixture prepared from materials selected from the group consisting of kaolin, dehydrated kaolin, feldspar, alumina hydrate, alumina, bauxite, sodium silicate, quartz, kieselguhr, finely divided silica, sodium aluminate, sodium carbonate, sodium hydroxide, sodium metaborate, borax, and/or anhydrous borax, to form said glass, said glass containing between about 0.8 to 1.15 mol of $Na_2O$ per each mol of $Al_2O_3$, $SiO_2$ and $B_2O_3$, having a molar ratio of $$SiO_2:Al_2O_3$$

between about 2:1 and 5:1, and a molar ratio of $$B_2O_3:Al_2O_3$$

of at least 1, dividing said glass into particles, treating said glass particles in aqueous medium at temperatures from about 60–100° C. for at least 12 hours to effect crystallization of said glass particles into faujasite zeolite, the water being used in a quantity of from about 400–1400 ml. per 100 g. of glass, and removing said faujasite zeolite from the aqueous medium.

11. Process according to claim 10, wherein said aqueous medium contains sodium hydroxide in an amount of from about 2 to 4 weight percent.

References Cited

UNITED STATES PATENTS

| | | | |
|---|---|---|---|
| Re. 13,691 | 2/1914 | Gans | 23—111 |
| 943,535 | 12/1909 | Gans | 23—111 |
| 1,116,038 | 11/1914 | Duggan | 23—111 |
| 2,882,244 | 4/1959 | Milton | 23—113 |
| 3,130,007 | 4/1964 | Breck | 23—113 |
| 3,119,659 | 1/1964 | Taggart et al. | 23—112 |
| 3,328,119 | 6/1967 | Robson | 23—113 |

EDWARD J. MEROS, Primary Examiner